United States Patent [19]

Bell, Jr.

[11] 3,715,514

[45] Feb. 6, 1973

[54] TELEPHONE SECURITY DEVICE

[75] Inventor: Allan D. Bell, Jr., Annandale, Va.

[73] Assignee: Dektor Counterintelligence and Security, Annandale, Va.

[22] Filed: Oct. 7, 1970

[21] Appl. No.: 78,765

[52] U.S. Cl. ..................................................179/81 E

[51] Int. Cl. ..................................................H04m 1/00

[58] Field of Search ..................179/81 E, 81 R, 81 C

[56] References Cited

UNITED STATES PATENTS

| | | | |
|---|---|---|---|
| 3,126,452 | 3/1964 | Pettersson | 179/81 R |
| 3,372,236 | 3/1968 | Schwartz | 179/81 E |
| 2,875,285 | 2/1959 | Hightower | 179/81 E |
| 2,619,550 | 11/1952 | Humphries | 179/81 R |
| 2,741,667 | 4/1956 | Schneider | 179/39 |
| 3,283,073 | 11/1966 | Campbell | 179/81 E |

FOREIGN PATENTS OR APPLICATIONS

| | | | |
|---|---|---|---|
| 1,155,490 | 10/1963 | Germany | 179/81 E |
| 1,051,285 | 12/1966 | Great Britain | 179/81 E |
| 1,066,624 | 10/1959 | Germany | 179/81 E |

*Primary Examiner*—Kathleen H. Claffy

*Assistant Examiner*—William A. Helvestine

*Attorney*—Roylance, Abrams, Berdo and Kaul

[57] ABSTRACT

A device for preventing use of an on-hook telephone for eavesdropping or "bugging." A voltage source is connected to the telephone line selector and hook switch through a diode matrix and sensing relay coil. When the telephone is "on-hook" (hook switch open) all conductors from the telephone instrument are short circuited together and are disconnected from the telephone conductors leading out of a private or secure area in which the telephone is located. The short circuiting is accomplished by a plurality of relays responsive to the condition of the sensing relay. When the instrument is off-hook the telephone conductors leading from the instrument are connected to the conductors leading from the area for normal conversational use. A lamp and photoresistor device is provided to isolate the annunciator from external conductors.

4 Claims, 3 Drawing Figures

FIG. I
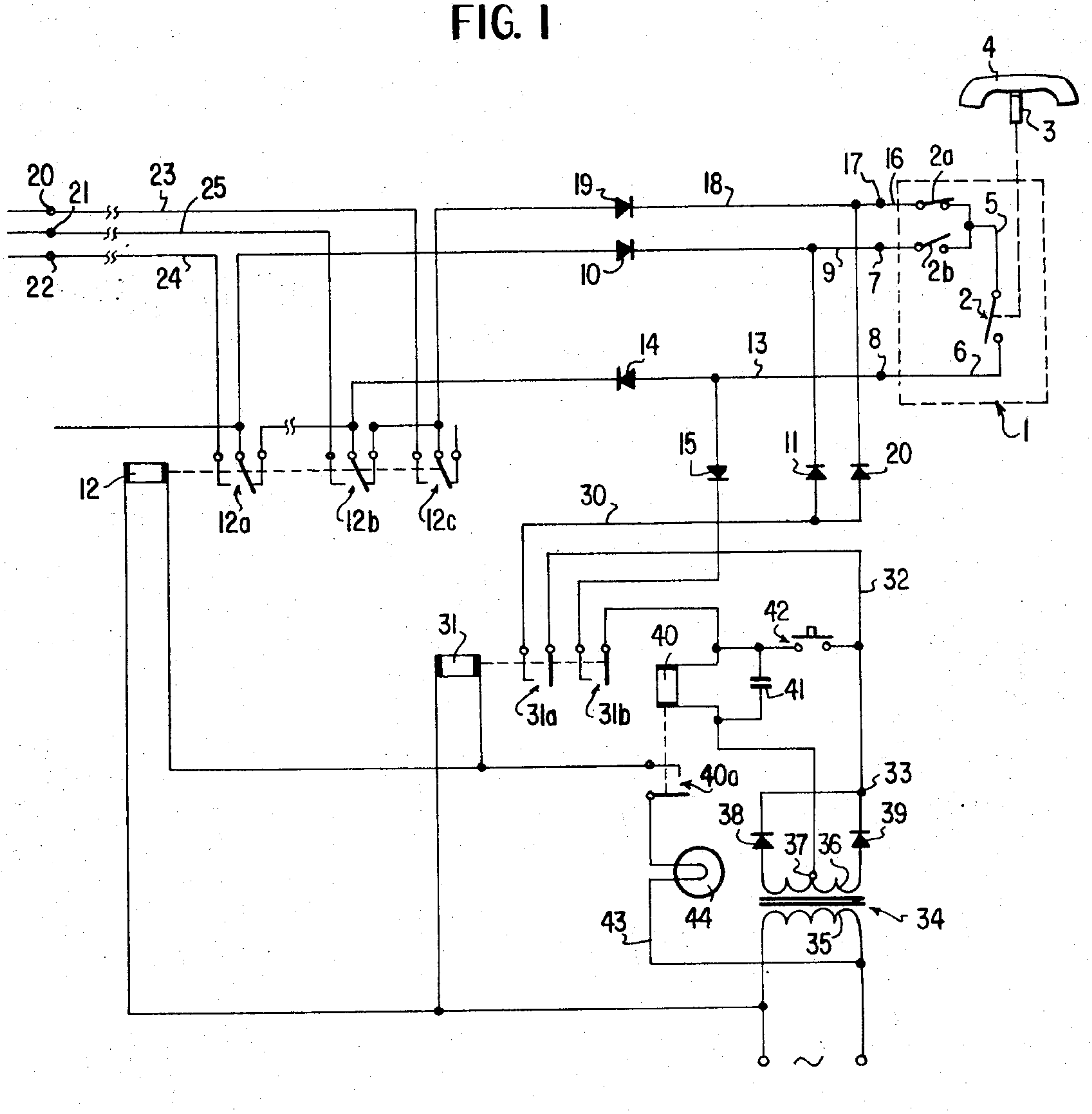
INVENTOR
ALLAN D. BELL, JR.
BY Koylance, Abrams, Berdo & Kaul
ATTORNEYS.

INVENTOR

ALLAN D. BELL, JR.

BY Roylance, Abrams, Berdo & Kaul

ATTORNEYS.

INVENTOR

ALLAN D. BELL, JR.

BY Roylance, Abrams, Berdo & Kaul
ATTORNEYS.

TELEPHONE SECURITY DEVICE

This invention relates to telephone security devices and especially to apparatus for preventing the use of a telephone as a surreptitious listening device when the telephone instrument is within a secure area and the conductors extending from the instrument pass outside the secure area.

Telephones have become such an integral part of daily life and such an important element in communication links that it is considered not possible to establish an office or any other kind of facility without having such an instrument available. However, because of its inherent structure and characteristics, a telephone provides one of the simplest possible means for eavesdropping for one who is interested in doing so. Consider, for example, a conference room which has been sound-proofed, locked, carefully examined for hidden microphones or the like, and has otherwise been made secure in the sense that words spoken within the room cannot be detected outside the room. However, the room includes a telephone which innocently rests beside or on the conference table. The telephone includes three transducers (speaking and listening microphones and a bell coil), switches including a hook switch, and electrical conductors leading from within the secure area to outside that area. By gaining access to the room for a very brief period of time, it is possible for one who is interested in eavesdropping on proceedings within the room to make a simple connection to one of the transducers and thereafter connect suitable equipment across the conductors outside of the secure area and listen to everything that takes place within the room even though the telephone is "hung up." The telephone, therefore, despite its convenience and desirability, provides a serious detriment simply by its presence.

An object of this invention is to provide an apparatus which is easily connectable to a telephone instrument, primarily one having multiple selectable lines, to render the telephone unusable for eavesdropping purposes.

A further object is to provide means for positively disabling the telephone as an eavesdropping instrument by preventing transfer of audio energy from the telephone instrument to conductors external of an otherwise secure area.

Yet another object is to provide an apparatus for rendering the telephone unusable as an eavesdropping device but which does not interfere with normal use of the telephone for conversational purposes.

A still further object is to provide an apparatus for preventing signal transmission from a telephone instrument when it is in its "on-hook" condition but which does not interfere either with incoming or outgoing telephone calls and which does not interfere with normal use of the instrument.

A further object is to provide means for rendering the telephone instruments secure without interfering with central switching equipment at the key telephone unit, which means is a reliable and long-life system and which is essentially tamper-proof.

In accordance with the invention, the apparatus includes means for connection to the conductors emanating from the telephone instrument, means for connecting to the conductors entering the secure area, means for connecting conductors together in proper relationship when the telephone is in normal use, and means for short circuiting together the various conductors emanating from the instrument by providing a direct connection between each of the conductors from the instrument and each other conductor from the instrument whenever the telephone is in its "on-hook" condition. The telephone instrument is thus completely electrically isolated from the outgoing telephone lines when the telephone is "on-hook," and a visual indication of the secure condition can be provided to indicate that the apparatus is properly working. Diode circuits are used to sense the on or off hook condition of the telephone and to activate relay circuits which interconnect the various telephone conductors. The apparatus can advantageously be housed within a case which is difficult to open, and if desired can be "potted" by filling the case with a hardenable material. The apparatus of the invention has utility, of course, in areas which are not sound-proofed or the like but which are secure in the sense of simply being private conference areas.

In order that the manner in which the foregoing and other objects are attained in accordance with the invention can be understood in detail, particularly advantageous embodiments thereof will be described with reference to the accompanying drawings, which form a part of the specification, and wherein:

FIG. 1 is a schematic diagram of a simplified version of the apparatus; and

FIGS. 2 and 3 are a schematic diagram of a more complete version of the system in which a fifty conductor instrument is rendered secure.

Figure 2A:
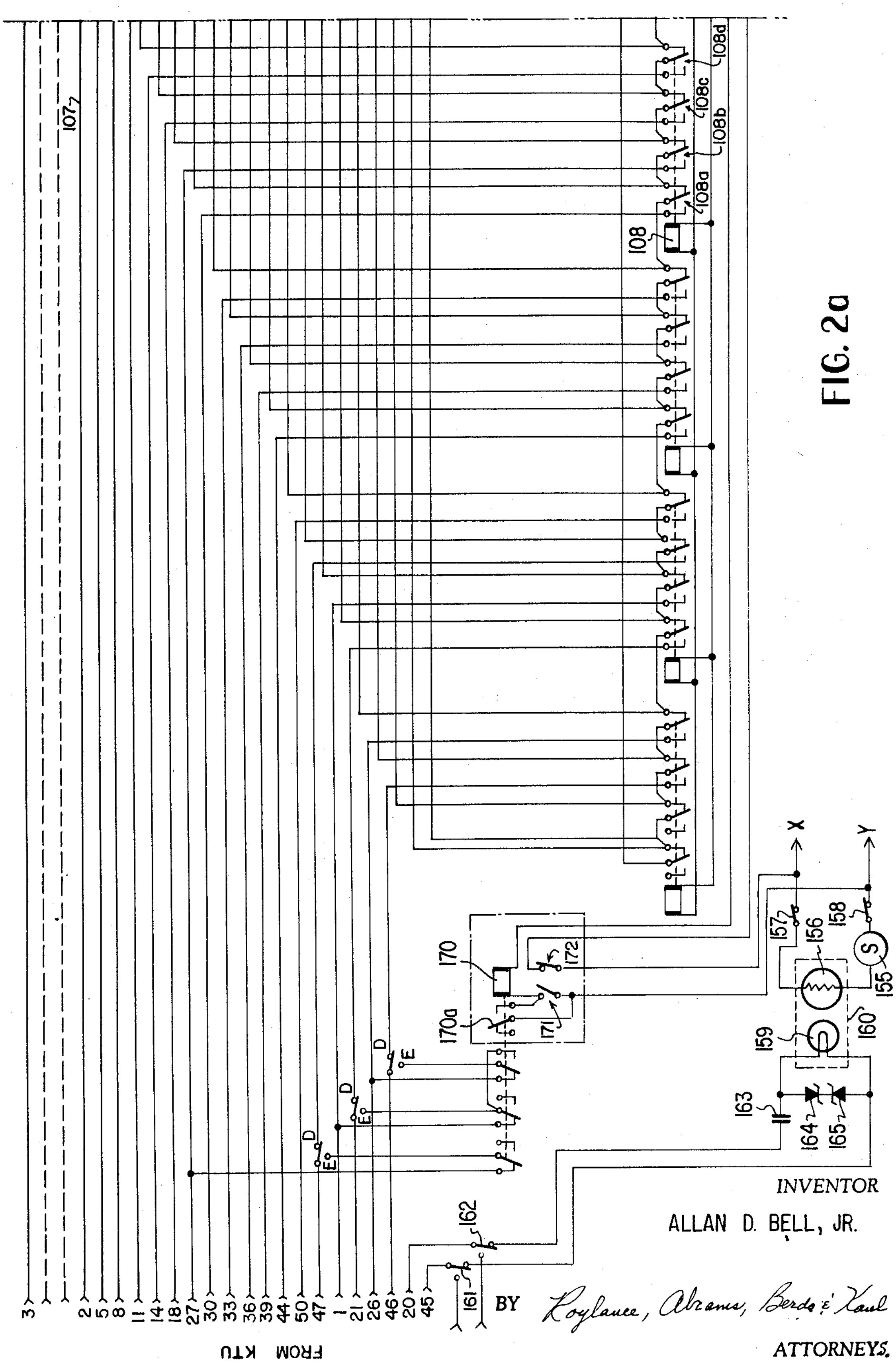

In the following detailed discussion of the invention it will be assumed that whenever one wishes to use the telephone rendered secure by this device for conversational purposes he simply does not say anything which he does not wish to have overheard. There are, of course, devices available which can receive audio or electrical signals in a telephone instrument, code or scramble those signals so that they cannot be understood without a decoder or unscrambler, and transmit these signals over the telephone conductors to a location at which decoding equipment is available. However, this invention has nothing to do with such scrambling devices and is effective to prevent eavesdropping through the telephone only when the telephone is in its on-hook or hung-up position. Scramblers can, of course, be used in conjunction with the present system but such apparatus is beyond the scope of the present invention.

FIG. 1 shows one embodiment of a basic system in accordance with the present invention, simplified for purposes of explanation. In that figure a telephone instrument indicated generally at 1 includes a switch such as switch 2 which is normally open and which is mechanically coupled to at least one button 3 which is depressed when the handset 4 is placed on the cradle in a well-known manner. When the handset is in place on the cradle, button 3 is depressed and switch 2 is open. When the handset is removed from its cradle button 3 is released and switch 2 is closed by a bias spring, not shown. A plurality of button or key switch devices such as switches **2*a* and 2*b* are also provided on conventional multiple line telephones, these switches being connected in parallel with each other and in series with hook switch 2. The key switches are connected mechanically to a conventional selection apparatus, not shown, which permits only one key switch to be closed at any given time. In FIG. 1, switch 2***a* is shown closed so that lifting the handset 4 connects the circuit associated with switch 2*a* through switch 2 for normal use.

Switch 2 is connected to conductors 5 and 6 which leave the case of the telephone instrument and would normally extend to the key telephone unit and external switching apparatus in the telephone system. However, in the present device these conductors are terminated at connectors entering the housing of the security device, the connectors for conductors 5 and 6 being indicated at 7 and 8. At connector point 7 a conductor 9 is connected to the cathode electrode of a conventional semiconductor diode 10 and to the cathode of a conventional diode 11. The anode of diode 10 is connected to the center contact of a single-pole, double-throw contact set indicated generally at 12*a*, contact set 12*a* being one of several sets of contacts operated by a relay winding 12.

Connector point 8 is connected to a conductor 13 which is connected to the anode electrodes of conventional semiconductor diodes 14 and 15, the cathode electrode of diode 14 being connected to the center contact of a single-pole, double-throw contact set indicated generally at 12*b*. An additional conductor 16, which is connected through key switch 2*a* within the telephone instrument, is connected to a connector point 17 which is connected to a conductor 18 connected to the cathode electrodes of diodes 19 and 20. The anode electrode of diode 19 is connected to the center contact of a single-pole, double-throw contact set indicated generally at 12*c*.

Relay 12 is shown in its deenergized position, which can also be referred to as the "secure" position, existing when the handset is in place in its cradle. In that position each center contact of each contact set 12*a–c* of relay 12 is connected to the front or normally closed contact of the set. The front contact of contact set 12*a* is connected to the center contact of contact set 12*b* and the front contact of contact set 12*b* is connected to the center contact of contact set 12*c*. Thus, the cathode electrode of diode 14 is connected to the anode electrode of diode 10 through contact sets 12*b* and 12*a*. Diode 19, which is connected to contact 12*c*, would also be connected to its equivalent diode at the other side of its hook switch in a complete system. Thus, when the handset is in place each conductor is short circuited to the other conductor of its pair, preventing the development of any signal incorporating intelligence from being generated therein. In addition, each such conductor is connected to the other conductors emanating from the telephone instrument. Thus, diode 14 is connected to diode 19 as well as diode 10 and, through additional relays and contact sets, would be connected in similar fashion to every other conductor emanating from the telephone instrument.

At the other side of the security device is another set of connectors indicated by connection points 20–22, which interconnect the internal wiring of the security device to the conductors leading to external switching equipment in the telephone system. Typical incoming conductors, which in normal conversational use of the telephone, would be connected to conductors 18, 9 and 13 respectively, are identified as conductors 23, 24 and 25. It will be observed that when relay 12 is in the secure position (deenergized) conductors 23, 24 and 25 are not connected to any portion of the telephone instrument. Conductor 23 is connected to the back contact of contact set 12*c* which is open. Likewise, conductors 24 and 25 are connected to the back contacts or normally open contacts, of contact sets 12*a* and 12*b*, respectively. However, when relay 12 is energized conductor 18 is connected through diode 19 to the center contact of the contact set 12*c* which is then in contact with the back contact of that contact set which is connected to conductor 23. It will be observed that the connection between the center contact of 12*c* and the front contact 12*b* is of no effect when relay 12 is energized because the front contact of set 12*b* is an open circuit. Similarly, the other conductors are connected through the center and back contacts with the shorting connections to the front contacts being left open.

The manner in which the relays are actuated will now be described. The system shown in FIG. 1 will be referred to as a "semi-automatic" system because in order to utilize the telephone for conversation it is necessary to lift the handset from its cradle and to then take a separate, positive step in order to energize relay 12. This is a desirable feature under certain circumstances because it eliminates the possibility of a handset, whether or not it is "bugged," from becoming a security risk by simply being accidentally knocked from its cradle.

In this system the anode electrodes of diodes 11 and 20 are connected to a conductor 30 which is connected to the fixed contact of a single-pole, single-throw contact set indicated generally at 31*a*. Contact set 31*a* is shown in its normally open condition which exists when its controlling coil, relay 31, is deenergized. The movable contact of set 31a is connected by a conductor 32 to the positive terminal 33 of a low voltage DC source of supply. The DC source includes a transformer 34 having a primary winding 35 connected to a source of AC voltage, and a secondary winding 36 which is center tapped at terminal 37. The end terminals of winding 36 are connected to the anode electrodes of rectifying diodes 38 and 39, the cathodes of which are both connected to terminal 33. Accordingly, a full-wave rectified DC voltage appears at terminal 33.

Center tap 37 is connected to one terminal of the energizing winding of a relay 40, the other terminal of which is connected to the movable contact of a contact set indicated generally at 31*b*. The fixed contact of set 31*b* is connected to the cathode electrode of diode 15. A delay-release capacitor 41 is connected in parallel circuit relationship with winding 40. A normally open momentary contact switch is connected between conductor 32 and the terminal of relay 40 which is connected to the movable contact of set 31*b*.

In parallel relationship with primary winding 35, the incoming AC power is connected to energize relays 12 and 31 when relay 40 is energized. Conductor 43 is connected between one side of the AC source and one terminal of an indicator lamp 44, the other terminal of which is connected to the movable contact of a single-pole, single-throw normally open contact indicated generally at 40*a* which is operated by winding 40. The fixed contact of set 40*a* is connected to one side of each of relay windings 31 and 12. The other side of each relay winding is connected to the other side of the AC source. Thus, when relay 40 is energized and when the system is suitably connected to the AC source, relays 12 and 31 are also energized.

The operation of the system thus far described is as follows:

When handset 4 is in place in the cradle, switch button 3 is depressed and switch 2 is open. Accordingly, there is no energization available for relay 40. Thus, contact set 40a is open and relays 12 and 31 are without power. A circuit can temporarily be provided for relay 40 by closing momentary contact switch 42 which completes a circuit from terminal 33 through switch 42, through winding 40 and back to center tap 37. This causes relay 40 to be energized, closing contact set 40*a*, illuminating lamp 44 and energizing relays 12 and 31. The telephone instrument conductors 16, 5, and 6 are then temporarily connected to the external conductors through 23–35, but as soon as switch 42 is released relay 40 is again deenergized, after a short delay due to capacitor 41, and the system is thereafter returned to its secure mode.

However, if handset 4 is removed switch 2 is closed, enabling the system. Then depression of momentary contact switch 42 causes energization of relay 40 which energizes relays 31 and 12 and a second circuit for relay 40 is provided through the closed contacts of contact set 31*b*, through diode 15, switch 2, diode 11, closed contact set 31*a*, and conductor 32. Then when switch 42 is released relay 40 remains energized, as do relays 12 and 31. Lamp 44 is then illuminated, indicating that the system is no longer secure but is connected to the external lines and that the telephone can be used for conversational purposes. Return of handset 4 to its cradle again opens switch 2, deenergizing the entire system after a brief delay. Lamp 44 is extinguished as soon as relay 40 is deenergized, indicating that the system is again secure.

It will be observed that the operation of the system can be checked at any time simply by depressing switch 42 and noting the illumination of lamp 44. It will also be observed that an unnoticed power failure in the AC supply to transformer 34 will not inhibit the security of the system because the secure circumstance exists with the relay 12 deenergized. The system is thus fail safe insofar as power failure is concerned.

It was previously mentioned that capacitor 41 is connected in parallel with the energizing coil of relay 40 to delay deenergization of that relay. The purpose of this delay is to prevent instantaneous deenergization of relay 40, which would occur in the absence of capacitor 41, during temporary opening of the circuit due to switching from line to line in the telephone instrument. With capacitor 41 the relay overlooks such temporary line openings but responds relatively quickly to instrument hang-up.

Figure 2B:
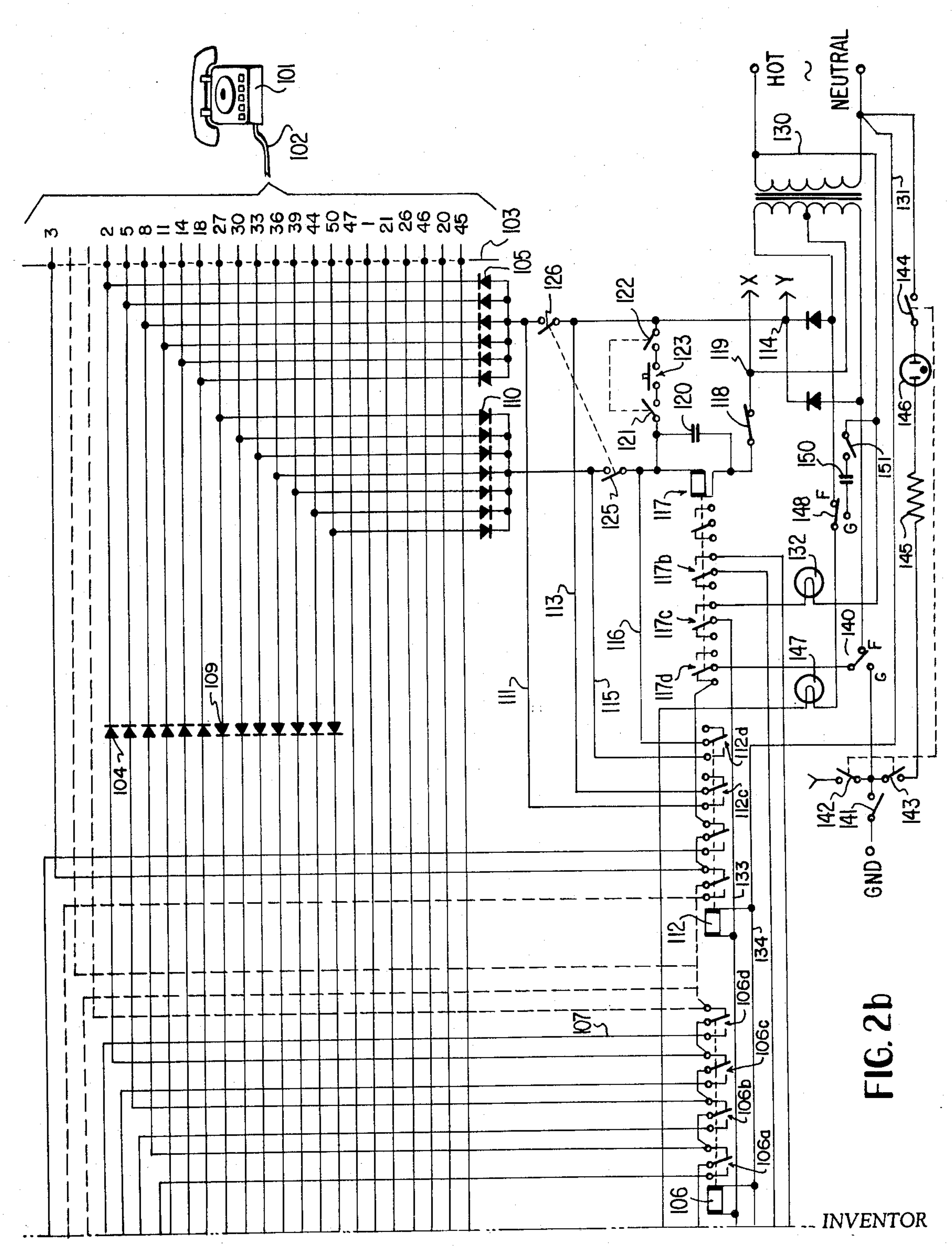

It will be observed that FIGS. 2*a* and 2*b* constitute a single schematic diagram of a more complete system which will now be described. The telephone instrument 101, which is illustrated as including a plurality of line switching push buttons, but which can be a unit of the switchboard or call director type, is connected by a multiconductor cable 102 to the security device by a connector of conventional type, indicated at the interface 103. The conductors are numbered in FIG. 2*a* and 2*b* in accordance with conventional telephone numbering techniques. Dotted lines between conductors 2 and 3 indicate the existence of additional conductors which are omitted from the drawing for simplicity. The conductors are connected in essentially identical manner, those going to the telephone hook switch being connected to diodes and all lines being connected through shorting relays as previously described. The connection of one pair of conductors will be described. Conductor 2 is connected to the cathode electrode of a conventional semi-conductor diode 104 and to the cathode electrode of a similar diode 105. The anode electrode of diode 104 is connected to the front contact of a contact set indicated generally at 106*c*, which contact set is operated by energization of a relay coil 106 which is shown in its deenergized condition. In the deenergized, or secure mode the front contact is connected through the center contact and front contacts of similar contact sets to other conductors emanating from the telephone instrument. When the relay is energized the front contact is connected through the center contact of contact set 106*d* and the back contact of set 106*d* to a conductor 107 which, in FIG. 2*a*, will be seen to be conductor 2 which, through suitable conventional connector means, goes to the conductors leading to the key telephone unit. In the key telephone unit and central switching equipment that conductor will be paired with conductor 27 (FIG. 2*a*) which enters the security device and is connected to the back contact of a contact set indicated generally at 108b which, when relay 108 is energized, is connected through the center contact of that set and the front contact of contact set 108*a* to the cathode electrode of a conventional semi-conductor diode 109. The anode electrode of diode 109 is connected to conductor 27 which leads to the telephone instrument and to the anode electrode of a diode 110.

Diodes 105 and 110 are connected to the sensing portion of the system which detects the off-hook condition of the telephone instrument and energizes relays 106 and 108. The anode electrode of diode 105 is connected through a conductor 111 to the back contact of a single-pole, double-throw contact set indicated generally at 112*c*, this contact set being operated by the energization of the winding of relay 112. When energized, conductor 111 is connected through the back contact and center contact of contact set 112*c* to conductor 113 which is connected to the positive terminal 114 of a DC power supply. The power supply includes a transformer and full-wave rectifier as previously described with reference to FIG. 1.

The cathode electrode of diode 110 is connected through a conductor 115 to a contact set 112*d* and, when the relay is energized, is connected to a conductor 116 which is connected to one terminal of the energizing winding of a relay 117. The other terminal of relay 117 is connected through a manually operated switch 118 to the negative terminal 119 of the DC power supply. A capacitor 120 is connected in parallel circuit relationship with the winding of relay 117 and functions in the same manner as did capacitor 41 in delaying the deenergization of relay 40, FIG. 1.

A pair of manually operated mechanically interconnected switches 121 and 122 are connected in series circuit relationship with each other and with a momentary contact push button switch 123. Switches 121 and 122 are shown in the position which they would occupy for the system to be in automatic operation. For semi-automatic operation these switches would be in the closed position and switch 123 would be momentarily closed to provide a temporary energization circuit for relay 117. In automatic operation switch 123 performs no function.

A manually operated switch 125 is connected between the cathode of diode 110 and relay 117, the switch also being in parallel circuit relationship with the back and center contacts of contact set 112*d*. Also, a manually operated switch 126, which is mechanically coupled to switch 125, is connected between the positive terminal of the DC source and the anode electrode of diode 105, the switch also being in parallel circuit relationship with the center and back contacts of contact of set 112*c*. Switches 125 and 126 are shown in the positions which they occupy for semi-automatic operation, these switches being closed for automatic operation. Switches 121, 122, 125 and 126 can, of course, be replaced by plug and jack arrangements without impairing the efficiency of operation. Also, the switches can be removed completely and the system permanently wired for either automatic or semi-automatic operation.

In fully automatic operation switches 125 and 126 are closed so that when a hook switch in the telephone instrument is closed a circuit exists from terminal 114 of the DC supply through switch 126 and either diode 105 or one of the other diodes connected in a manner similar to diode 105 to the appropriate hook switch and back to diode 110 or one of the other diodes connected in the manner of diode 110. The circuit is then completed through switch 125, the winding of relay 117 and switch 118 and back to terminal 119 at the negative side of the DC supply. When the handset is removed from the instrument closing the hook switch this circuit exists without any additional conditions so that relay 117 is energized. We must now turn our attention to the primary winding of the DC supply transformer which is connected to an AC source and which is in parallel circuit relationship with conductors 130 and 131 across the AC source. Conductor 130 is connected to a lamp 132 and to the back contact of a single-pole, double-throw contact set 117*c* operated by relay 117. When relay 117 is energized the back contact is connected to the center contact, providing power on a conductor 133 which is connected to one terminal of each of relays 112, 106, 108 and the other relays which perform the security shorting function and are connected in the same manner as relays 106 and 108. The other terminal of each of these relays is connected to conductor 131 which returns to the other side of the AC supply.

As will be seen from the above discussion, in the automatic operation sequence the sensing function is performed through the diodes as soon as the hook switch is operated by lifting the handset from the telephone instrument. The voltage appearing at terminals 114 and 119 which performs this sensing function is blocked, as will be recognized by those skilled in the art, by the diodes connected in the manner of diodes 104 and 109 and therefore does not appear at any point in the telephone system other than in the security device itself and in the telephone instrument. Thus, the functions of the telephone unit and other switching equipment is not affected at all.

For semi-automatic operation, as described with reference to FIG. 1, switches 121 and 122 are closed and switches 125 and 126 are open. Accordingly, the sensing voltage does not have a complete circuit through the telephone until switch 123 is momentarily depressed, energizing relay 117 and relay 112. Energization of relay 112 operates contact sets 112*c* and *d* which close the circuit portions which are closed during automatic operation by switches 125 and 126. If, on depression of switch 123, a circuit exists through the telephone instrument, relay 117 will remain energized when switch 123 is allowed to reopen and relay 112 remains energized. Likewise, relays 106, 108 and the other shorting relays remain energized, connecting the various telephone lines to the key telephone units.

Another feature which can optionally be provided in the system is that of grounding the various shorted contacts directly to an earth ground. As discussed so far, these shorting contacts are interconnected to each other but are not connected to an earth ground. If the earth ground is desirable it can be provided by utilization of additional switches shown in FIG. 2*b*. It will be observed that the conductors and contact sets which perform the shorting function are all ultimately connected to the front contact of contact set 117*d* and, hence, to the center contact thereof when relay 117 is in the deenergized or secure mode. The center contact of that set is connected to the center terminal of a single-pole, double-throw switch 140 which is movable between a G position and an F position. The F position is used when the contacts are allowed to remain ungrounded or "floating." When switch 140 is placed in its G position set 117*d* is connected to a switch 141 which, when closed, connects the contact set to a ground terminal which can then be earthed in any well-known convenient manner. Additional switches 142, 143 and 144 are also closed when grounded operation is to be employed, switch 142 providing an additional jack for grounding other portions of the system and switches 143 and 144 being used to connect a ground loss detector circuit to the system. The ground loss detector circuit includes the series connection of a resistor 145 and a neon bulb 146 between the neutral side of the AC source and ground. When the ground terminal is connected to earth and the various switches are closed, neon bulb 146 is not illuminated, indicating that a ground exists. The illumination of bulb 146 indicates that the ground has been lost and that corrective measures should be taken.

An additional indicator is provided to indicate when the contacts are shorted in either the grounded or "-floating" condition, this indicator being a green lamp 147 which is connected in series circuit relationship with a single-pole, double-throw switch 148 between the secondary of the DC supply transformer and a center contact of one of the grounding relays. In the secure mode this lamp is connected between all of the shorted circuits and the AC supply and will be illuminated only when the contacts are all shorted together, regardless of the existence of a ground.

When switch 148 is placed in its G or grounded position the lamp 147 is connected through a capacitor 150 and a switch 151 to the hot side of the AC supply. The capacitor is used to provide a voltage drop from the primary level to the lower secondary voltage to permit use of the same lamp on either supply.

Thus far the discussion has been limited to isolating only two of the three transducers in the telephone instrument, the transmitting and receiving elements in the handset. However, a third transducer generally exists, this being a resonant ringer (annunciator) in the telephone instrument. If conductors are directly connected to the annunciator from the external bell wires this can provide a security risk. Normally, the resonant ringer is either mounted in the instrument or in a wall-mounted box. In the present invention, the annunciator within the telephone (or separate box) is rendered inoperative by shorting contacts and a separate annunciator 155 is provided in the security device. The separate annunciator is connected in series circuit relationship with a photoresponsive transducer such as a radiation variable resistor 156. The annunciator and resistor are connected in series circuit relationship with a pair of switches 157 and 158 which can be manually operated to disconnect the annunciator if desired. The series circuit thus far described is connected to terminals *x* and *y* which are connected to the positive and negative terminals of the DC supply at *x* and *y*, FIG. 2*b*. A lamp 159 is connected in light conducting relationship with resistor 156 within a dark box 160. The ringer lines 20 and 45 (conventional telephone numbering) are connected through single-pole, double-throw switches 161 and 162 and through a capacitor 163 to a lamp 159. Capacitor 163 provides an AC voltage drop to permit the annunciator to be used with either the 70–110 volt 20 Hertz ringer voltage or the 16–20 volt 60 Hertz buzzer voltage. Zener diodes 164 and 165 are connected in series circuit relationship with each other, in reversed polarity, and in parallel circuit relationship with lamp 159 to act as a voltage limiter, preventing burn out of the lamp from the application of excessive voltage. Switches 161 and 162 are available to direct the ringer voltage to an auxiliary annunciator device, if desired. As shown, the ringer voltage will be applied directly to the lamp which, when illuminated, causes the resistance of resistor 156 to drop, permitting the DC voltage to be applied to the annunciator, causing it to buzz or ring. It will be observed that while the incoming lines are always available to operate the annunciator there is absolute isolation in the opposite direction, i.e., no signal generated by the annunciator or in the series circuit including the annunciator can be transmitted to the outgoing lines.

It is common to provide what is known as an exclusion feature in many multiple line telephones. While the exclusion function cannot be performed with a disconnected telephone, an optional device can be provided with the apparatus of the present invention to allow it to be performed. This device includes a relay 170 having multiple single-pole double-throw contact sets, the relay being connected across the power supply at terminals *x* and *y* and across the center and back contacts of contact set 117*b*. The energizing winding of relay 170 is in series circuit relationship with the center and back contacts of 117*b* and is also in series with single-pole, single-throw manually operated switches 171 and 172. Lines 47, 21 and 46 each include selector switches which can be placed in the D, or non-exclusion, position as shown in FIG. 2*a* or which can be moved to the E, or exclusion, position. Each of these switches, in the E position, is connected to one of the contact sets of relay 170, contact set 170*a* being connected as a latchup set for relay 170. When in the E position, and when a call has been completed energizing relay 117, switch 171 can be operated to energize relay 170 and to cause the exclusion to take effect. Exclusion is terminated upon hangup or, at any time, by operation of switch 172 which deenergizes relay 170.

While certain advantageous embodiments have been chosen to illustrate the invention it will be recognized by those skilled in the art that various changes and modifications can be made therein without departing from the scope of the invention as defined in the appended claims.

What is claimed is:

1. A security apparatus for preventing undesired signal transmission from a telephone instrument in a secure area to telephone conductors external of the secure area, the telephone instrument being of the type having a hook switch and line selector means, the apparatus comprising the combination of a housing;

first connector means associated with said housing for receiving a plurality of pairs of conductors entering the secure area;

second connector means associated with said housing for receiving a plurality of pairs of conductors from a telephone instrument;

a plurality of diodes connected to said pairs of conductors from the telephone instrument to form a plurality of individual circuit portions through the telephone instrument, each circuit portion being selectively completable through the telephone instrument and said second connector means by the line selector means and hook switch;

first and second terminals within said housing connected to the ends of said circuit portion;

a power supply;

a sensing relay including a relay winding connected in series circuit relationship with said power supply between said first and second terminals, said sensing relay winding being energizable by completion of one of said individual circuit portions to close a normally open contact set;

at least one additional relay each including a winding and a plurality of contact sets, each said winding being energizable upon energization of said sensing relay winding;

each said contact set of said at least one additional relay being movable between a position in which all conductors from said instrument are connected to each other and a position in which said conductors at said first connector means are connected, in predetermined relationship, to said conductors at said second connector means.

2. Apparatus according to claim 1 wherein the series circuit including said sensing relay and said power supply further includes a manually operable switch closable to temporarily energize said relay regardless of the completeness of any of said individual circuit portion; and at least one contact set operable by energization of said sensing relay winding to a closed position to maintain said relay energized if any of said individual circuit portion is complete when said manually operable switch is reopened.

3. A security apparatus for preventing undesired signal transmission from a telephone instrument in a secure area to telephone conductors external of the secure area, the telephone instrument being of the type having a hook switch and line selector means, the apparatus comprising the combination of a housing external of and separate from the telephone instrument;

first connector means associated with said housing for receiving conductors from a telephone instrument;

second connector means associated with said housing for receiving conductors from a telephone instrument;

relay circuit means within said housing for sensing an on-hook condition in said telephone instrument; for providing a direct connection between each of said conductors from the telephone instrument whenever said telephone is in its on-hook condition; for disconnecting said conductors entering said secure area from conductors connected to the telephone instrument whenever the telephone is in its on-hook condition; and for conducting said conductors entering said secure area to said conductors from the telephone instrument when said telephone instrument is in its off-hook condition;

an annunciator; and unidirectional energy transmission means connected to said selected ones of said conductors entering said secure area for actuating said annunciator in response to a call signal on said conductors.

4. Apparatus according to claim 3 wherein said unidirectional energy transmission means includes a photoresponsive circuit element connected in circuit relationship with said annunciator across said source of voltage; and a light generator mounted in illuminating relationship with said resistor and connected to ringer lines at said first connector means.

* * * * *